(No Model.)
W. ESTY.
UNIVERSAL JOINT COUPLING FOR SHAFTING.
No. 565,159. Patented Aug. 4, 1896.
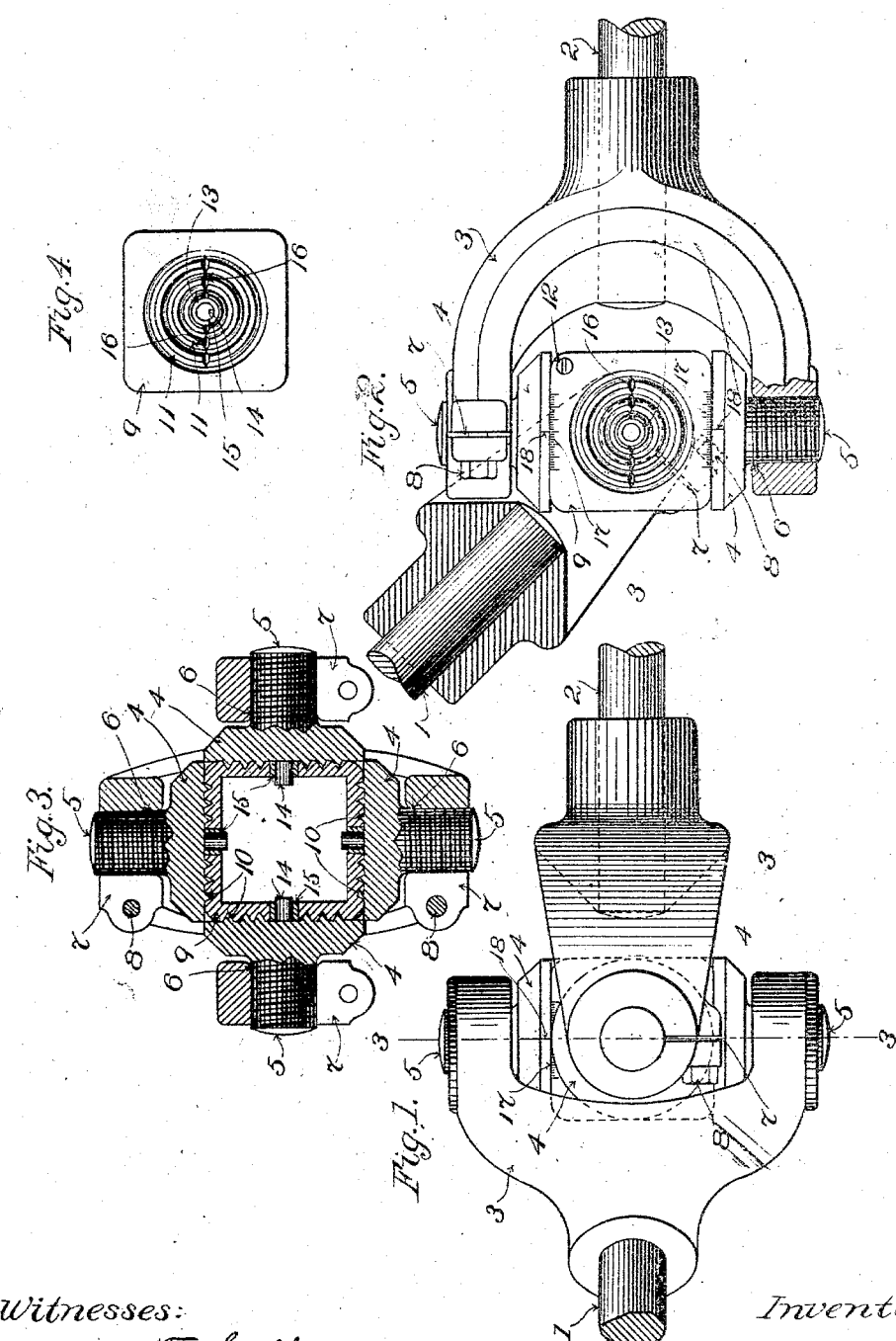
Witnesses:
Oscar F. Hill
Alice H. Morrison
Inventor:
William Esty
by Macleod Calver & Randall
his Attorneys

UNITED STATES PATENT OFFICE.

WILLIAM ESTY, OF LACONIA, NEW HAMPSHIRE.

UNIVERSAL-JOINT COUPLING FOR SHAFTING.

SPECIFICATION forming part of Letters Patent No. 565,159, dated August 4, 1896.

Application filed April 10, 1896. Serial No. 586,903. (No model.)

*To all whom it may concern:*

Be it known that I, WILLIAM ESTY, a citizen of the United States, residing at Laconia, in the county of Belknap and State of New Hampshire, have invented certain new and useful Improvements in Universal - Joint Couplings for Shafting, of which the following is a specification, reference being had therein to the accompanying drawings.

The invention consists in certain improved and novel features of construction and in a novel and useful combination of parts, and first will be described with reference to the accompanying drawings, after which the novel features thereof will be more particularly pointed out, and distinctly defined in the claims at the end of this specification.

Figure 1 of the drawings is a view illustrating the best embodiment of my invention which I have yet devised. Fig. 2 is a view showing the same in different position with certain parts in section in order to show the construction more clearly. Fig. 3 is a view in cross-section on line 3 3 of Fig. 1. Fig. 4 shows the cube in elevation.

1 2 respectively designate portions of shafting which are disposed at an angle to each other.

3 3 designate fork-shaped yokes which are mounted on the proximate ends of the said pieces of shafting, the said yokes standing at right angles to each other.

4 4 are disks applied to the free ends of the arms of the respective yokes, each disk having a central stem or pin 5, which passes through a hole 6 in the arm to which it is applied, the pin and hole being screw-threaded to fit each other, thereby enabling the disk to be adjusted in or out in the direction of the length of its pin by rotating it in the proper direction. The threaded socket which the foregoing construction provides for the reception of the pin of each disk is split, as at 7, to enable it to be contracted upon the pin after the corresponding disk has been adjusted into the required position, the contraction being effected by means of a bolt 8.

The disks which are connected with the opposite arms of one yoke are applied to diametrically opposite faces of a cube 9, while the disks which are connected with the opposite arms of the other yoke are applied to another pair of diametrically opposite faces of the said cube. For the purpose of preventing displacement of the disks upon the respective faces of the cube, the contacting surfaces of the said disks and faces are grooved correspondingly, the projections 10 on the one part entering the grooves 11 of the other part, as shown clearly in Fig. 3. In the rotation of the parts, the disks and cube turn relatively to each other on two axes which are at right angles to each other, such axes corresponding with the longitudinal axes of the pins pertaining to the respective pairs of disks. In order to permit this relative movement, the grooves of the disks and of the faces of the cube are formed concentric with the centers of the respective parts.

Cube 9 is made hollow, its interior space constituting a receptacle for oil, the oil being introduced through a hole that is closed by a screw or other desired closure, (indicated at 12.) Each working side of the cube has a central hole 13 therethrough, in which is placed a suitable means of feeding the oil to the contacting faces of the disks and cube. I have shown for the purpose a plug of wood 14, which I drive into each hole, said plug being surrounded by felt 15. Cross-grooves 16 16 lead the oil outward from the center of each working face of the cube and distribute it to all the concentric grooves in the said face and the disk which is applied thereto.

For the purpose of enabling the cube to be centered properly in setting up the parts or whenever occasion arises for changing the position of the disks, I employ in connection with each disk a scale 17 and an index 18, one of these being upon the disk and the other upon the cube adjacent to such disk. When all the disks occupy positions in which the respective indices come opposite corresponding marks on the various scales, the cube will occupy the desired central positions.

The described construction is strong and durable and is kept oiled continually, the reservoir within the cube requiring to be refilled only at intervals.

I claim as my invention—

1. The combination with the opposite yokes of the disks rigidly applied to the arms of said yokes, and the cube having pairs of diametrically opposite working faces on which the said disks take bearing, substantially as described.

2. The combination with the opposite yokes, of the disks rigidly applied to the arms of said yokes, and the cube having pairs of diametrically opposite working faces on which the said disks take bearing, and also having an internal reservoir for oil and means to feed the oil to the contacting surfaces of the disks and cube, substantially as described.

3. The combination with the opposite yokes, of the disks rigidly applied to the arms of said yokes, and the cube having pairs of diametrically opposite working faces on which the said disks take bearing, the said disks and cube having intermeshing concentrically-grooved surfaces, substantially as described.

4. The combination with the opposite yokes, of the disks having concentrically-grooved faces and applied to the arms of said yokes, and the cube having pairs of diametrically opposite concentrically-working grooved faces on which the said disks take bearing, the contacting surfaces of the disks and faces of the cube intermeshing as described, the said cube also having an internal reservoir for oil and means to feed the oil to the contacting faces of the disks and cube, substantially as described.

5. The hollow cube for universal-joint couplings having four sides thereof grooved concentrically and having means to feed oil from the interior thereof to the said grooved sides, substantially as set forth.

6. The disk 4 for universal-joint couplings having a concentrically-grooved working face, substantially as set forth.

In testimony whereof I affix my signature in presence of two witnesses.

WILLIAM ESTY.

Witnesses:
 FRED O. PHELPS,
 O. W. TIBBETTS.